(12) United States Patent
Beaird, III et al.

(10) Patent No.: US 8,220,849 B2
(45) Date of Patent: Jul. 17, 2012

(54) DEVICE FOR MOUNTING AN ACCESSORY ON A MOTOR VEHICLE

(76) Inventors: Robert L. Beaird, III, Pawling, NY (US); Eric M. Beaird, Douglas, MA (US)

( * ) Notice: Subject to any disclaimer, the term of this patent is extended or adjusted under 35 U.S.C. 154(b) by 122 days.

(21) Appl. No.: 12/855,743

(22) Filed: Aug. 13, 2010

(65) Prior Publication Data

US 2011/0049914 A1   Mar. 3, 2011

Related U.S. Application Data

(60) Provisional application No. 61/275,305, filed on Aug. 27, 2009.

(51) Int. Cl.
*B60R 19/52* (2006.01)
(52) U.S. Cl. .......................... 293/115; 293/117; 293/142
(58) Field of Classification Search ................. 180/68.6; 280/500, 504, 505; 293/114, 115, 116, 117, 293/142, 146, 147, 148
See application file for complete search history.

(56) References Cited

U.S. PATENT DOCUMENTS

| | | | |
|---|---|---|---|
| 4,204,701 A | 5/1980 | Oltrogge | |
| 4,204,702 A | 5/1980 | Oltrogge | |
| D257,430 S | 10/1980 | Hickey | |
| 6,290,271 B1 * | 9/2001 | Geisler | 293/115 |
| 6,447,032 B1 * | 9/2002 | Howell, Sr. | 293/115 |
| 6,523,806 B2 | 2/2003 | Bartal | |
| 6,979,016 B1 * | 12/2005 | Wegener | 280/505 |
| 7,344,120 B2 | 3/2008 | McFarland | |
| 2002/0117654 A1 | 8/2002 | Bartal | |
| 2005/0104325 A1 | 5/2005 | Rodgers | |
| 2006/0022471 A1 * | 2/2006 | Rood | 293/115 |
| 2007/0234528 A1 | 10/2007 | Kanzler et al. | |
| 2009/0212581 A1 * | 8/2009 | Drever | 293/115 |
| 2011/0006553 A1 * | 1/2011 | Fretz et al. | 293/115 |

OTHER PUBLICATIONS

Truckspring.com web page "Mile Marker Cradle Winch Mount".
Ningbo Lift Winch Manufacture Co. Ltd. web page.

* cited by examiner

*Primary Examiner* — Dennis Pedder
*Assistant Examiner* — Jason S Daniels
(74) *Attorney, Agent, or Firm* — Karl F. Milde, Jr.; Eckert Seamans Cherin & Mellott, LLC

(57) ABSTRACT

A device, and a kit a parts for forming such a device, for removably attaching an accessory, such as a winch, to a motor vehicle comprises a brush guard in the shape of a frame that provides support for the vehicle accessory. The brush guard is formed by two upright members and at least one cross-member interconnecting and retaining the two upright members in rigid, spaced-apart relationship. Each of the upright members has two substantially horizontally extending mounting bars, one at each end, for its removable attachment to the motor vehicle.

52 Claims, 12 Drawing Sheets

DEVICE FOR MOUNTING AN ACCESSORY ON A MOTOR VEHICLE

CROSS-REFERENCE TO RELATED APPLICATION

This application claims priority from U.S. Provisional Application No. 61/275,305, filed Aug. 27, 2009.

BACKGROUND OF THE INVENTION

The present invention relates to a device for mounting an accessory to a motor vehicle. More particularly, the invention relates to a device, and a kit of parts for a device that, when assembled together and mounted on the front of a motor vehicle, facilitates the attachment of a useful accessory, such as a winch, a basket. a leaf blower, a well puller, or even a motorbike, to the motor vehicle.

It is known to attach an electrically powered cable winch to the front of a motor vehicle, such as a pickup truck. To do so, the vehicle must usually be modified to accommodate the winch and, once it is mounted, the winch is normally left in place on the vehicle. Once mounted, the winch cannot be used elsewhere, on another vehicle or in a stationary configuration for example. Also, while on the front of the vehicle, the winch is exposed to the elements and subject to damage should the front of the vehicle come in contact with any other object.

Cable winches come in all different sizes. A winch with a significant capacity is relatively heavy and is usually mounted on a heavy duty vehicle such as a three quarter ton or larger truck. A typical winch of this type is the 16.5 Warn winch which has a 16,500 pound capacity. This winch weighs approximately 140 pound and, for this reason alone, is difficult to install on, and remove from, a motor vehicle as a single unit.

When operated in the northern part of the United States, heavy duty pickup trucks are often used for plowing snow. To do so, a winch (if mounted in front) must be removed and a snow plow attached. Snow plows are normally attached to the vehicle frame with a three-point hitch, having two plow mounting receptacles below the front bumper in front of the two front wheels and one central hydraulic mount for lifting the plow. The so-called "Fisher Minute Mount" plow frame has become standard for this purpose. The lower points of attachment, which are quick-release, are permanently installed and available for use whenever the plow is removed.

Many heavy duty four wheel drive vehicles, such as the Ford 250 and 350 pickups, have U-shaped "D-Rings" extending forward on the front of the vehicle to permit attachment of a cable or chain. These rings are bolted to the frame through an opening in the bumper or grille.

The prior art is replete with devices to facilitate attachment of an accessory to a motor vehicle. For example, it is known to provide removable devices having a single connection bar of square cross section for insertion in a mounting sleeve attached to the vehicle frame. These devices provide a planar platform for mounting a winch or any other similar accessory. Examples are the "Mile Marker Cradle Winch Mount", available from www.truckspring.com, and the detachable winch mounting system available from the Ningbo Lift Winch Manufacture, Co., Ltd., in China. In use, the winch must be bolted to the platform, requiring time, effort and special tools. Once bolted, the mounting platform can be attached to and removed from the vehicle relatively quickly. However, the platform with the winch is extremely heavy and requires two persons to mount on the vehicle.

The U.S. Pat. Nos. 4,204,701 and 4,204,702, both to Oltrogge, disclose a "universal quick detach accessory mount" for motor vehicles having means for connecting a tow hitch to two points on the vehicle bumper or frame. Similarly, the U.S. patent publication No. US 2005/0104325 discloses a motor vehicle "tow hook assembly" which provides for connection to two points on the front of a vehicle.

All of these prior art systems connect a vehicle accessory to only one, or at most two, mounting points on the vehicle. Such mounting systems are not sufficiently robust and rigid to withstand the forces that occur when traversing rough terrain with a heavy vehicle accessory and which can be applied in the case of an electric cable winch.

SUMMARY OF THE INVENTION

It is a principal object of the present invention to provide a device which facilitates the attachment of an accessory to the front of a motor vehicle in a rigid manner which permits quick disengagement and removal.

It is a further object of the present invention to provide a device which facilitates the attachment and removal of an accessory to the front of a rugged motor vehicle, such as a heavy-duty pickup truck, having a vehicle frame and two mounting receptacles, each attached to the frame and positioned below the grille, for quick-attachment and detachment of a mounting bar. These mounting receptacles may be of the type used for attaching a snow plow for example.

It is a further object of the invention to provide a kit of parts for assembling and installing a device of the aforementioned type.

These objects, as well as further objects which will become apparent from the discussion that follows, are achieved, in accordance with the present invention, by a vehicle accessory mounting device, and a kit of parts for such a device, that includes, as a minimum, the following elements:

(a) A brush guard formed by two substantially parallel upright members and at least one cross-member interconnecting and retaining the two upright members in rigid, spaced-apart relationship. Each of the upright members has two substantially horizontally extending mounting bars for removable attachment of the brush guard to the motor vehicle. The two higher mounting bars on the two upright members form two upper mounting bars and the two lower mounting bars on the two upright members form two lower mounting bars. The brush guard provides support for the removable attachment of a motor vehicle accessory.

(b) Two upper mounting brackets, adapted to be attached to the vehicle frame in spaced-apart relationship at the front of the vehicle above the two mounting receptacles. Each upper mounting bracket forms a hitch for a respective one of the two upper mounting bars of the brush guard.

(c) Two mechanical fasteners for retaining the upper mounting bars on the upper mounting brackets.

With this arrangement, each of the two lower mounting bars is insertable in a respective one of the two mounting receptacles.

The brush guard is thus attachable to the front of a motor vehicle at four connection points, making the attachment extremely rigid and robust.

The two upper mounting brackets can be custom designed for installation on a particular vehicle. The two lower mounting receptacles are preferably of the type known for use in connection with a snow plow, or they may be also custom designed for installation on a particular vehicle. The mounting brackets and receptacles should, in any case, be rigidly connected with the vehicle frame.

The brush guard provides a support for attachment of the motor vehicle accessory.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
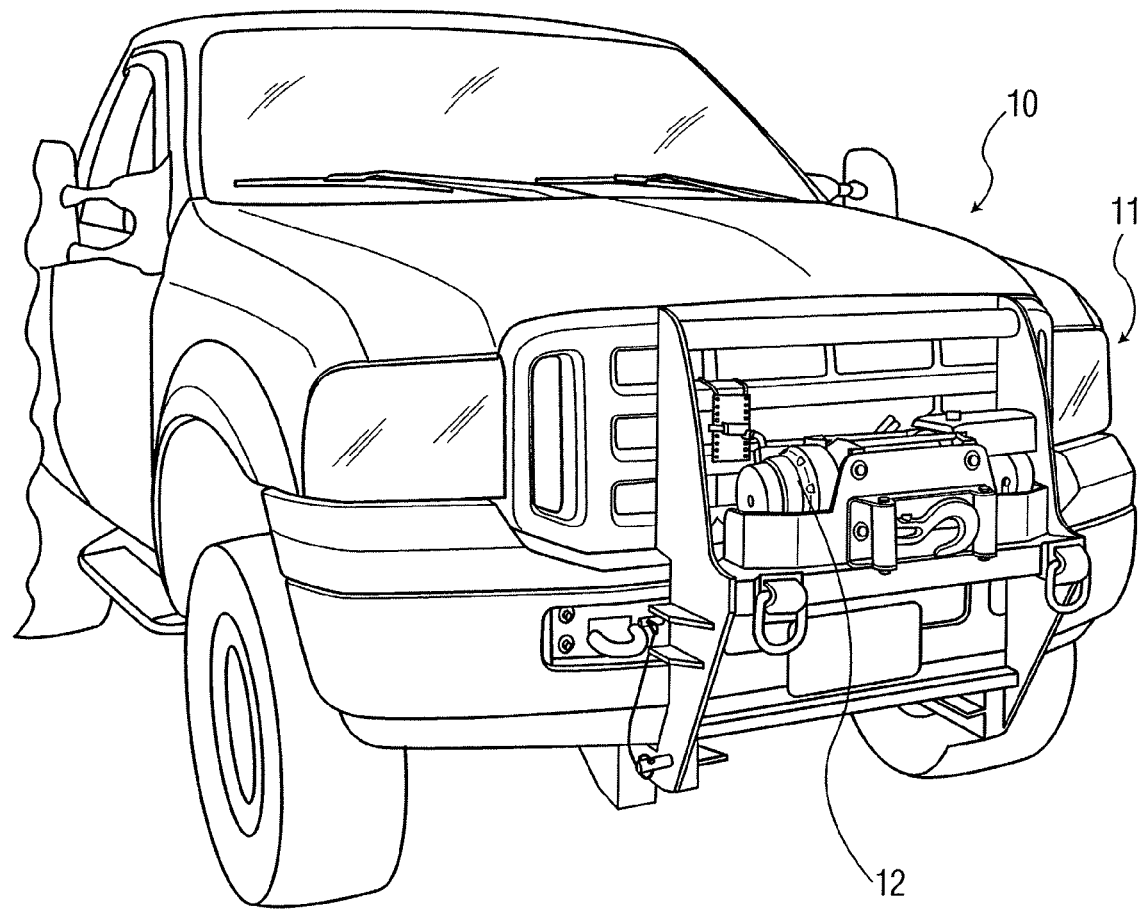
FIG. 1 is a perspective view showing the front of a motor vehicle (in this instance, a Ford F350 pickup truck) to which has been attached a device, according to the preferred embodiment of the present invention, for mounting a vehicle accessory (in this instance, a Warn cable winch).

The preferred embodiments of the present invention will now be described with reference to FIGS. 1-22 of the drawings. Identical elements in the various figures are designated with the same reference numerals.

FIG. 1 shows a Ford 350 pickup truck 10 with the device 11 according to the present invention for mounting a vehicle accessory (in this instance, a 16.5 Warn cable winch 12). The vehicle accessory mounting (VAM) device 11, without the winch accessory, is shown in FIG. 2.

The VAM device can be supplied completely assembled, either separately or factory installed on a motor vehicle, or can be furnished as a kit of parts which are assembled by the user. These parts, and their relationship to a motor vehicle, are illustrated in an assembly diagram shown in FIG. 6.

Figure 2:
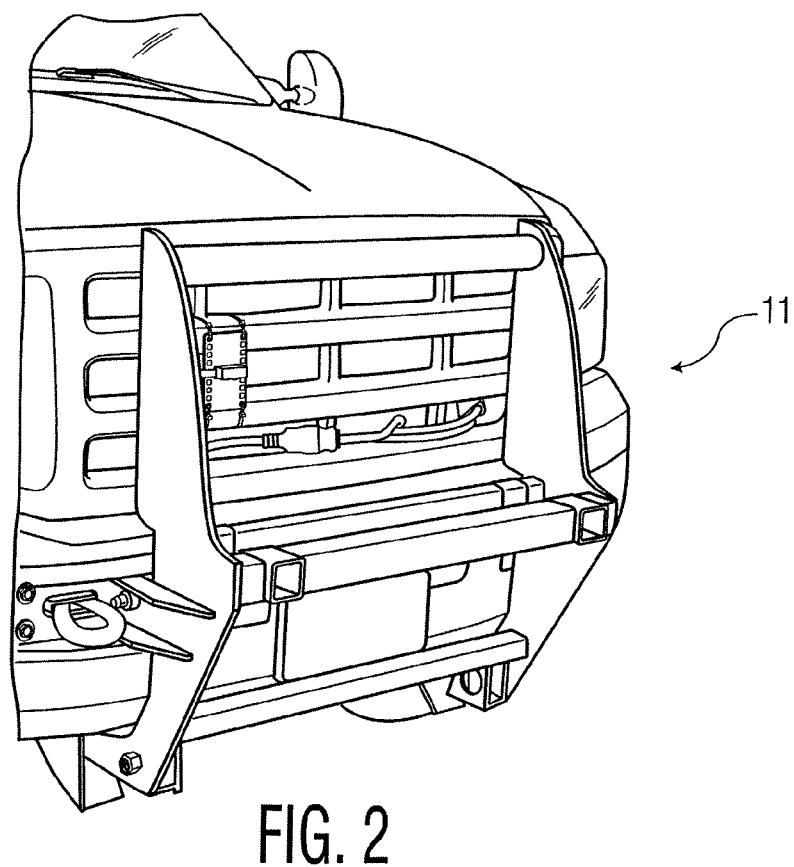
FIG. 2 is a perspective view similar to that of FIG. 1, showing the vehicle accessory mounting (VAM) device, without an accessory (e.g., a winch).
Figure 6:
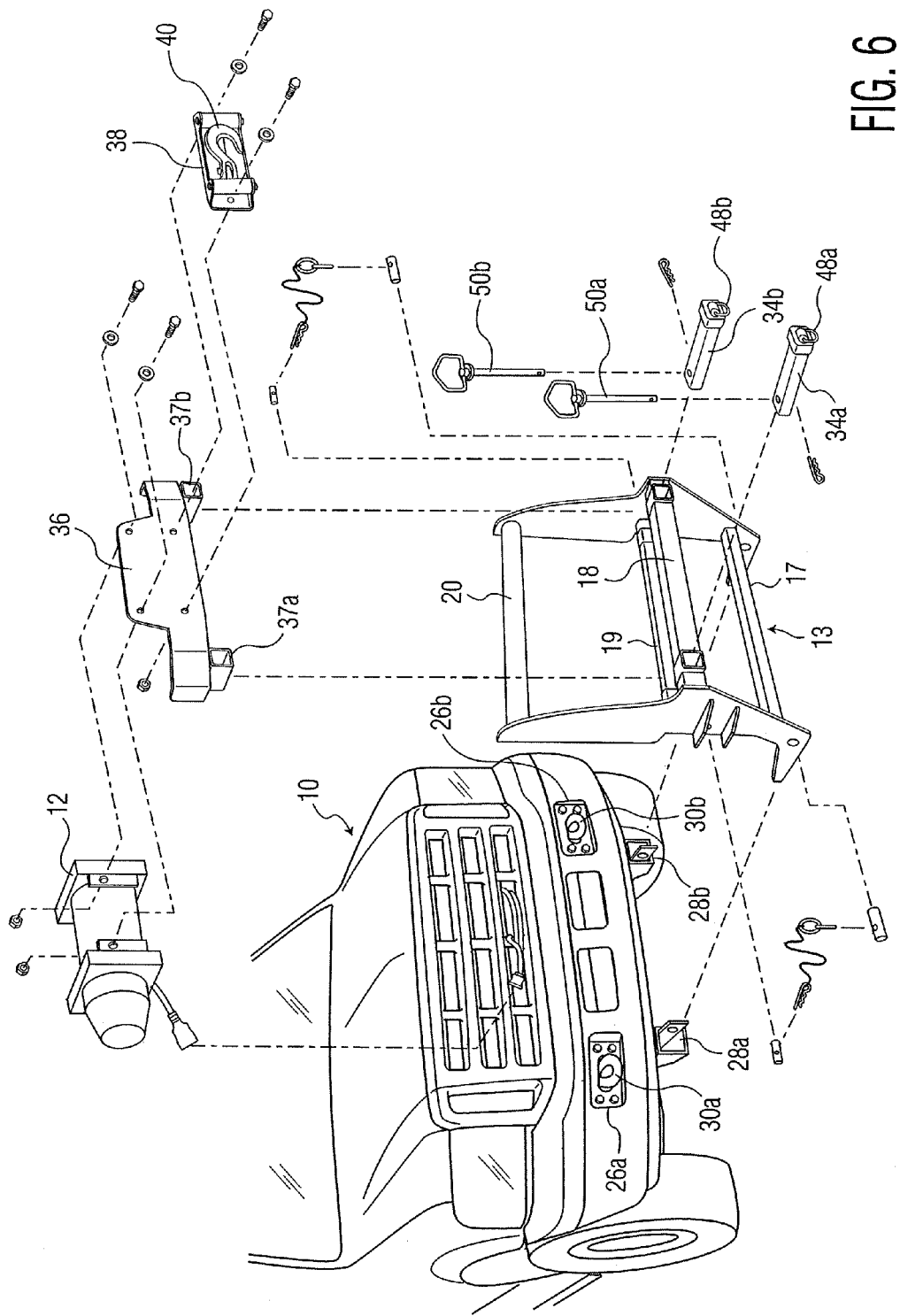
FIG. 6 is an assembly diagram showing various parts of the VAM device of FIGS. 1 and 2 in relation to a motor vehicle to which it is to be attached.
Figure 7:
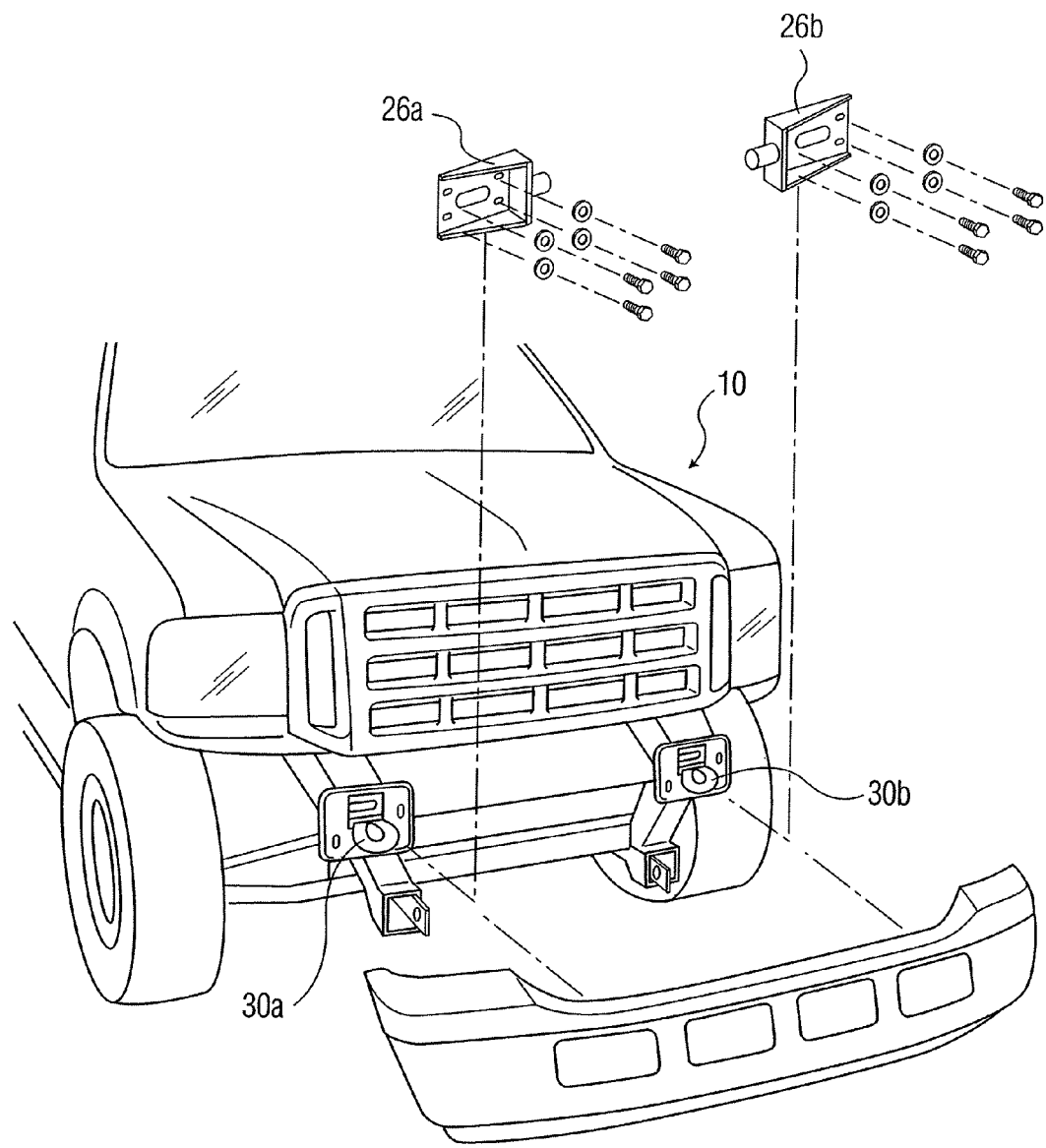
FIG. 7 is a further assembly diagram showing two upper mounting brackets, which form a part of the VAM device according to the present invention, in relation to a motor vehicle (with the bumper removed) to which they are to be attached.

The motor VAM device, as illustrated in FIGS. 1, 2 and 6, comprises a brush guard 13 designed to support a vehicle accessory such as the cable winch 12.

Figure 3:
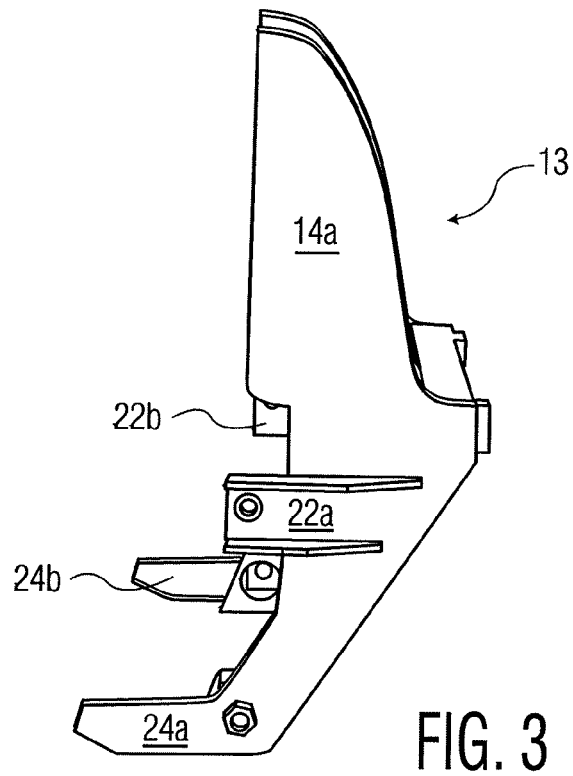
FIG. 3 is a side view of a brush guard forming part of the VAM device of FIGS. 1 and 2.
Figure 4:
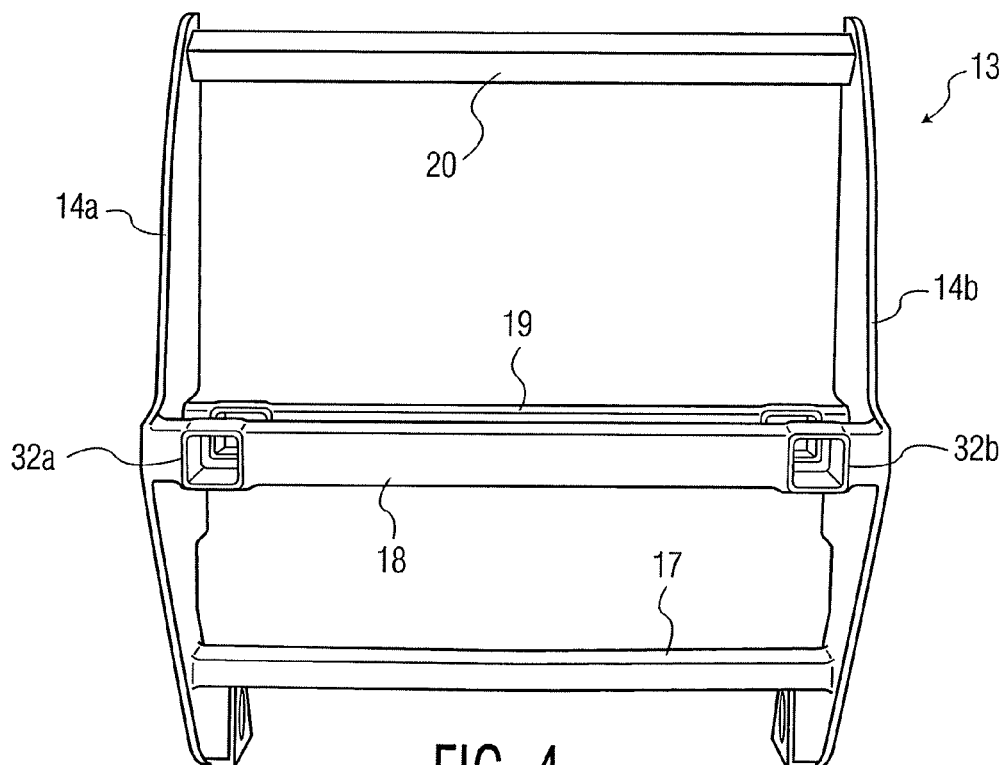
FIG. 4 is a front view of the brush guard of FIG. 3.
Figure 5:
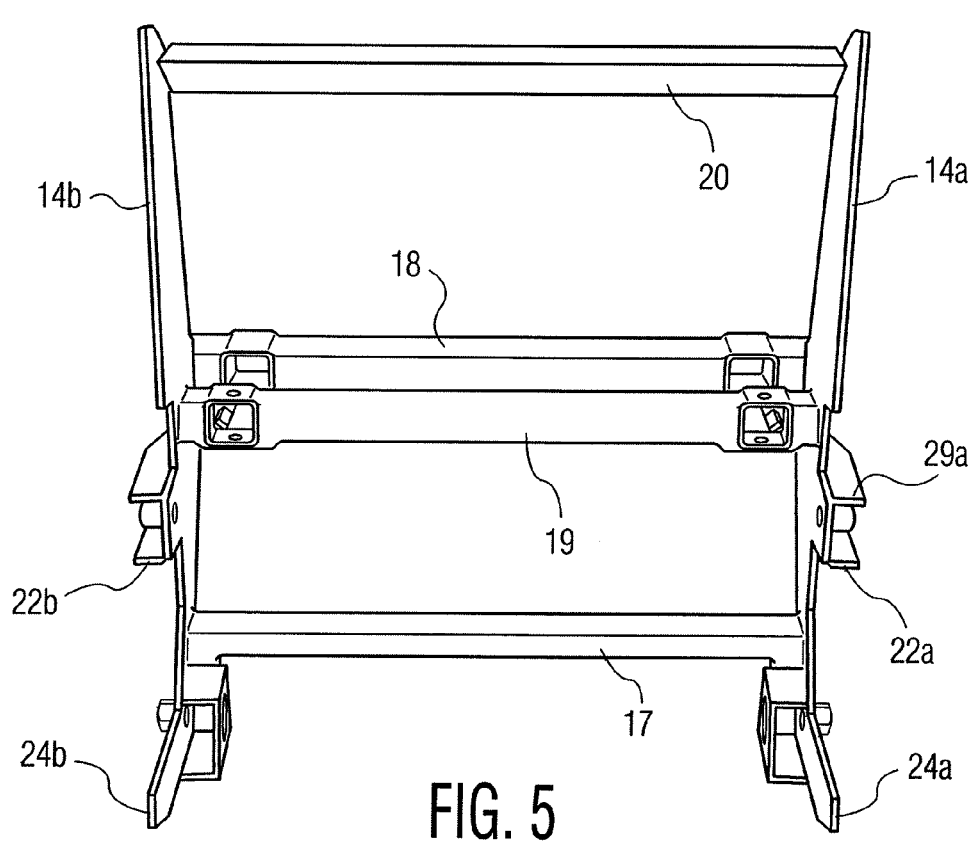
FIG. 5 is a rear view of the brush guard of FIGS. 3 and 4.

The brush guard 13, as shown in detail in FIGS. 3-5, comprises two vertically upstanding members 14a, 14b arranged substantially in parallel with cross members 17, 18, 19, 20 interconnecting and retaining the two upright members in rigid, spaced-apart relationship.

Each of the upright members 14a and 14b has two substantially horizontally extending mounting bars 22 and 24 for removable attachment of the brush guard to the motor vehicle. The left upright member 14a of the brush guard therefore has horizontal mounting bars 22a and 24a; the right upright member 14b has mounting bars 22b and 24b.

The two higher mounting bars of the brush guard 22a, 22b form two upper mounting bars and the two lower mounting bars 24a, 24b form two lower mounting bars for removable attachment to respective upper mounting brackets and lower mounting receptacles on the motor vehicle. The brush guard can therefore be quickly and easily attached to or removed from the motor vehicle.

Referring again to the assembly diagram of FIG. 6, the motor vehicle is shown with upper mounting brackets 26a and 26b and lower mounting receptacles 28a and 28b. The lower mounting receptacles 28 may be factory installed or retrofitted for attachment and quick release of a snow plow. Such receptacles, such as the Fisher Minute Mount, are well known and have become standard on many heavy duty vehicles.

The mounting brackets 26 are custom designed in accordance with the present invention and fitted to the particular motor vehicle. Brackets 26a and 26b designed for a Ford 350 pickup truck are shown in the assembly diagram of FIG. 7. These brackets are attached to the frame of the truck by means of four bolts, as shown in the diagram, with the bumper removed.

Figure 10:
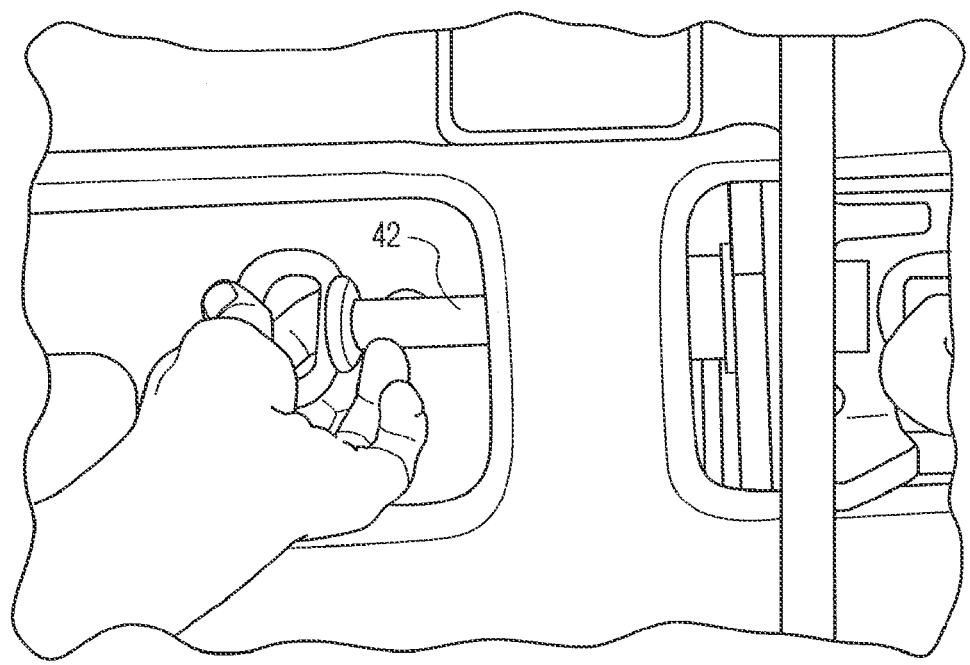
FIG. 10 is a detailed view showing insertion of a mounting pin for attachment of the brush guard to an upper mounting bracket of the VAM device.
Figure 11:
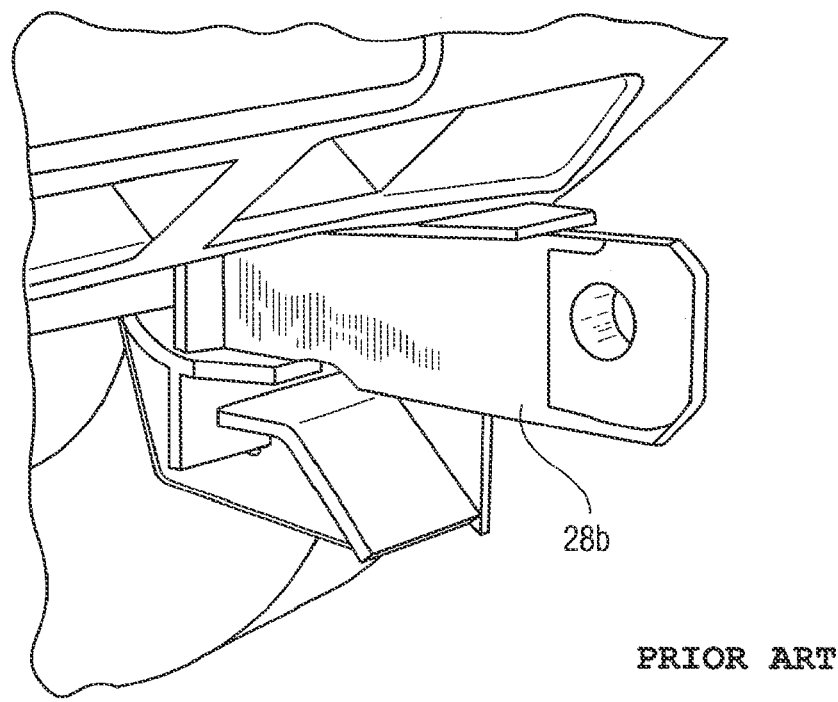
FIG. 11 is a detailed view showing a prior art mounting receptacle (in this instance, a "Fisher Minute Mount"), attached to the frame below the grill of a motor vehicle, which may be used for attachment of the brush guard of the VAM device.
Figure 16:
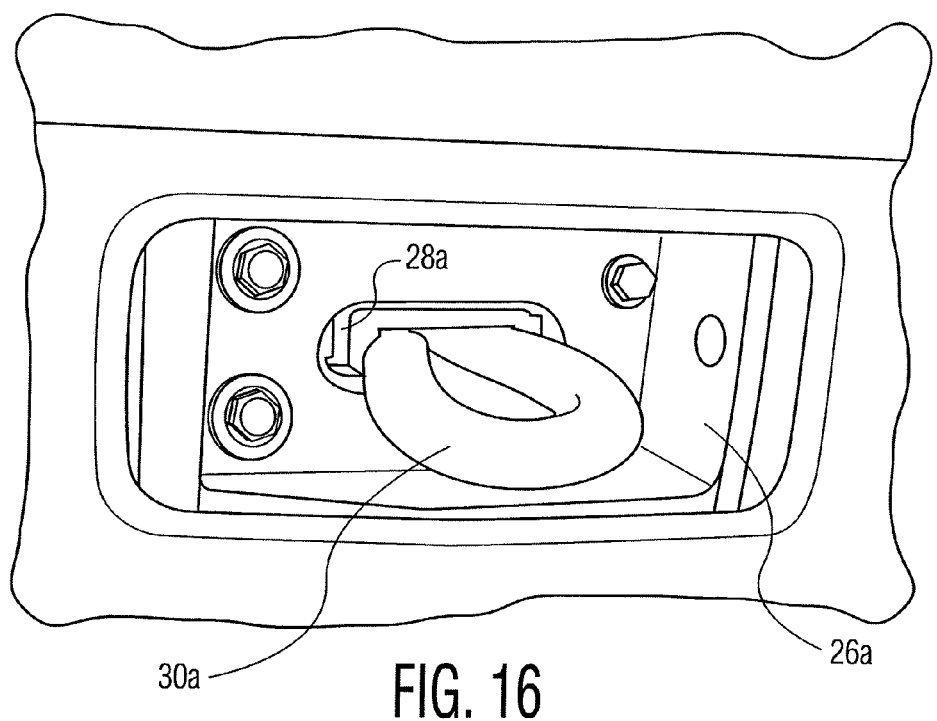
FIG. 16 is a detailed view showing an upper mounting bracket of the VAM device, attached to a motor vehicle.
Figure 17:
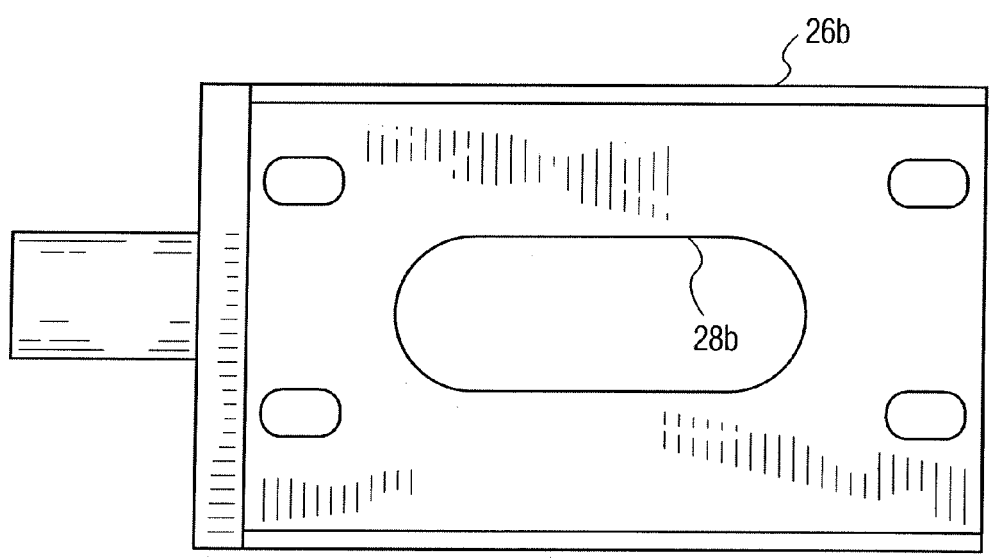
FIG. 17 is a front view of the mounting bracket of FIG. 16.
Figure 18:
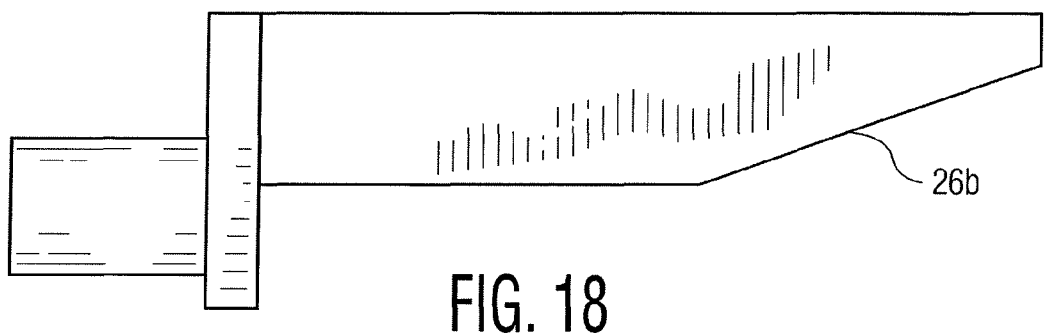
FIG. 18 is a top view of the mounting bracket of FIG. 16.
Figure 19:
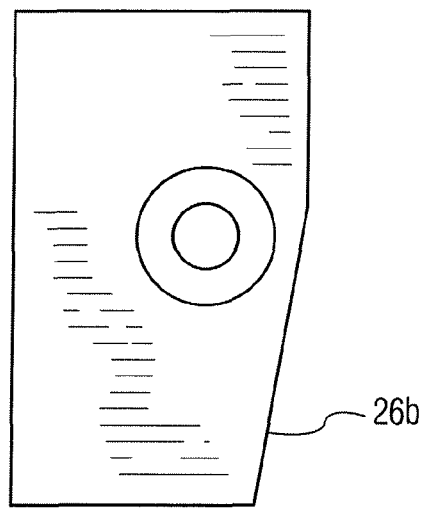
FIG. 19 is a view of one end of the mounting bracket of FIG. 16.
Figure 20:
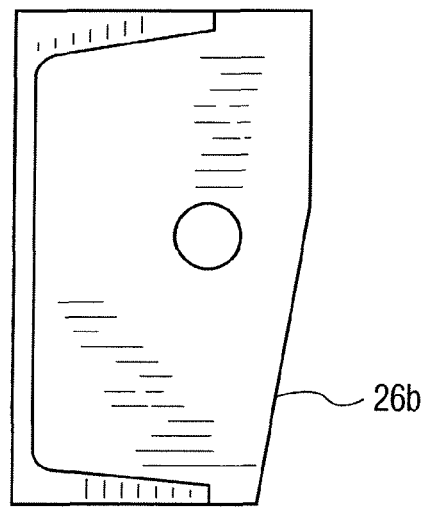
FIG. 20 is a view of an opposite end of the mounting bracket of FIG. 16.

Mounting brackets 26 according to the present invention for a Ford 350 pickup truck are shown in detail in FIGS. 16-20. As is best seen in FIGS. 16 and 17, the mounting bracket includes a mounting plate fabricated with an opening 28 for the factory installed D-ring 30 that protrudes through the bumper of this vehicle. Four holes in the mounting plate permit attachment to the vehicle in an upright position substantially transverse to the longitudinal axis of the vehicle. Each mounting bracket also includes a transverse plate rigidly attached on one side of the mounting plate with a recess for insertion of a mechanical fastener, such as pin 42 (FIG. 10).

Returning to FIGS. 4-6, it may be seen that a space is provided between two cross members 18 and 19 of the brush guard 13. In addition, large openings 32a and 32b are provided in the cross members for insertion of retaining anchors 34a and 34b, respectively. These openings, as well as the retaining anchors, preferably have a rectangular (e.g., square) cross section to prevent rotation and maintain rigidity. As is best illustrated in FIG. 6, the cross members 18 and 19, and retaining anchors 34a and 34b serve to retain an accessory holder 36 which is attached to the vehicle accessory (winch) 12. Once attached, the base of the accessory holder 36, together with its accessory 12, is insertable into the gap between the connecting members 18 and 19 and held in place by the retaining anchors 34.

If desired, a bracket 38 with a hinged cable hook 40 may also be attached to the accessory holder 36 by suitable bolts, as shown in FIG. 6.

Figure 8:
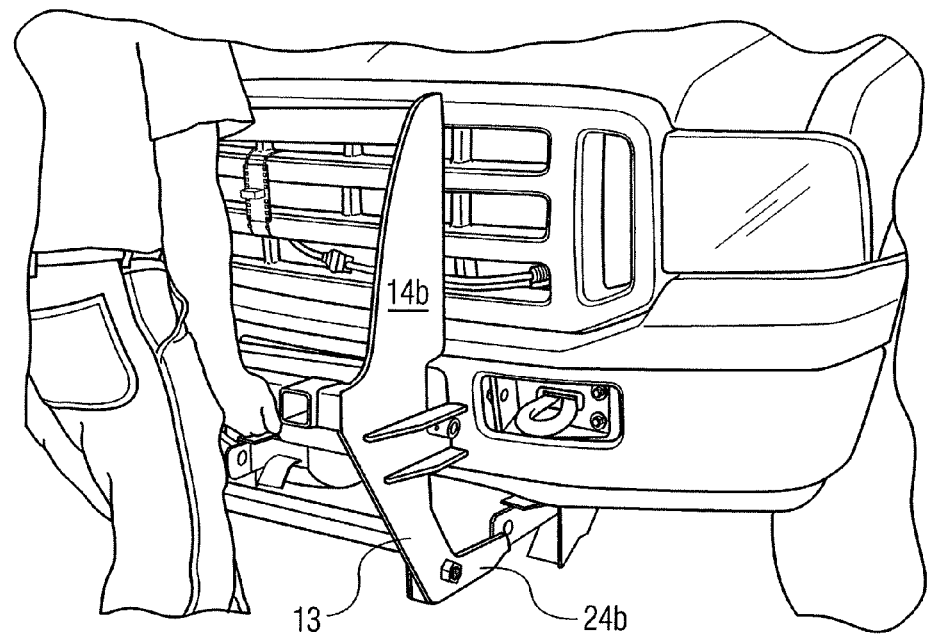
FIG. 8 is a perspective view showing how the brush guard of the VAM device is mounted on, or removed from, a motor vehicle.

Once assembled from the kit of parts, with the brackets 26 attached to the motor vehicle, the brush guard 13 can be quickly and easily attached or removed in the manner shown in FIG. 8. When attached, this brush guard provides a robust and rigid frame for attachment of a vehicle accessory 12, such as a winch.

Figure 9:
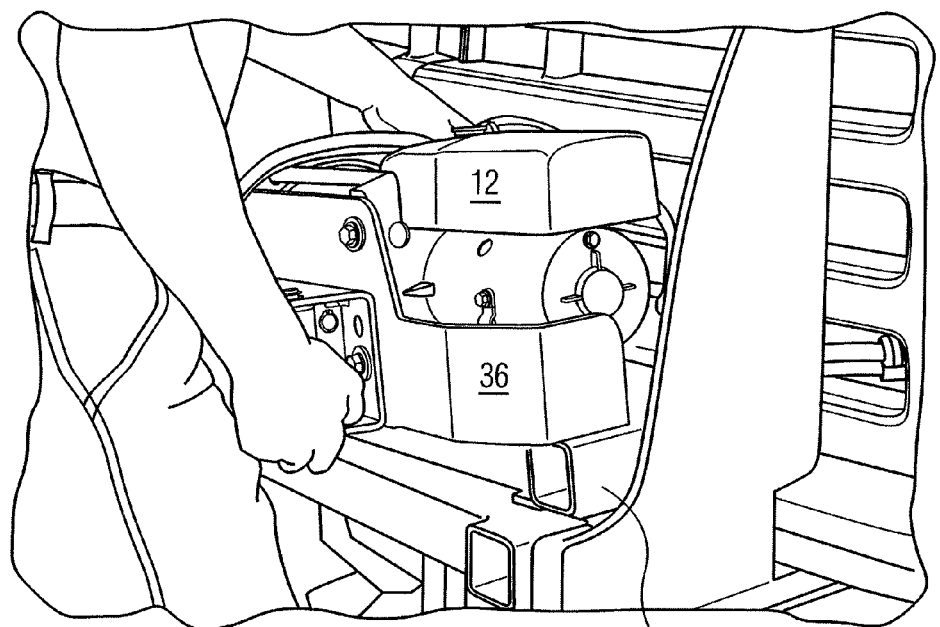
FIG. 9 is a perspective view showing how a vehicle accessory (in this instance, a winch) is mounted on, or removed from, the VAM device.

FIG. 9 illustrates how such a winch may be quickly and easily installed in, or removed from, the brush guard.

Figure 12:
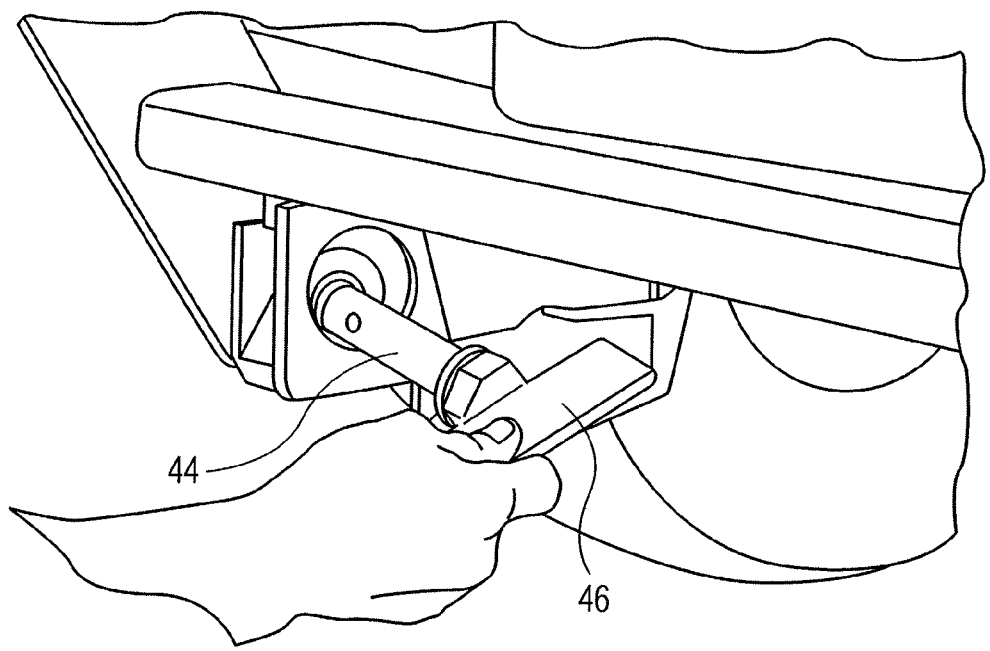
FIG. 12 is a detailed view showing the insertion of a mounting pin for securing the brush guard of the VAM device to the mounting receptacle of FIG. 11.

Once mounted on a motor vehicle with its four connection points, the brush guard 13 is retained in position by means of pins 42 inserted through the mounting brackets 26, as shown in FIG. 10, and pins 44, as shown in FIG. 12, inserted through the mounting receptacles 28. The pins 44 are preferably provided with a handle 46 to facilitate insertion and removal.

Figure 13:
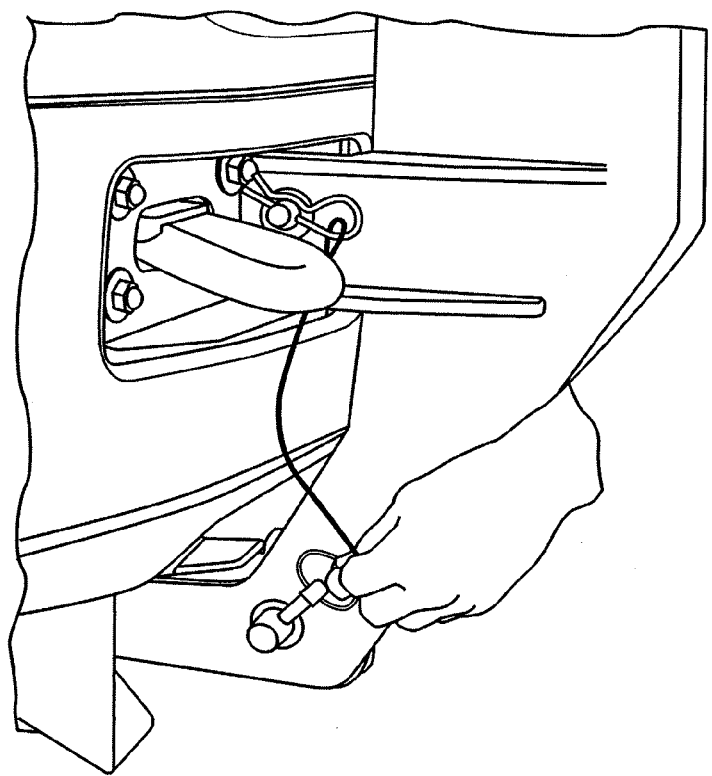
FIG. 13 is a detailed view showing the insertion of clips to retain the upper and lower mounting pins for the brush guard of the VAM device.
Figure 14:
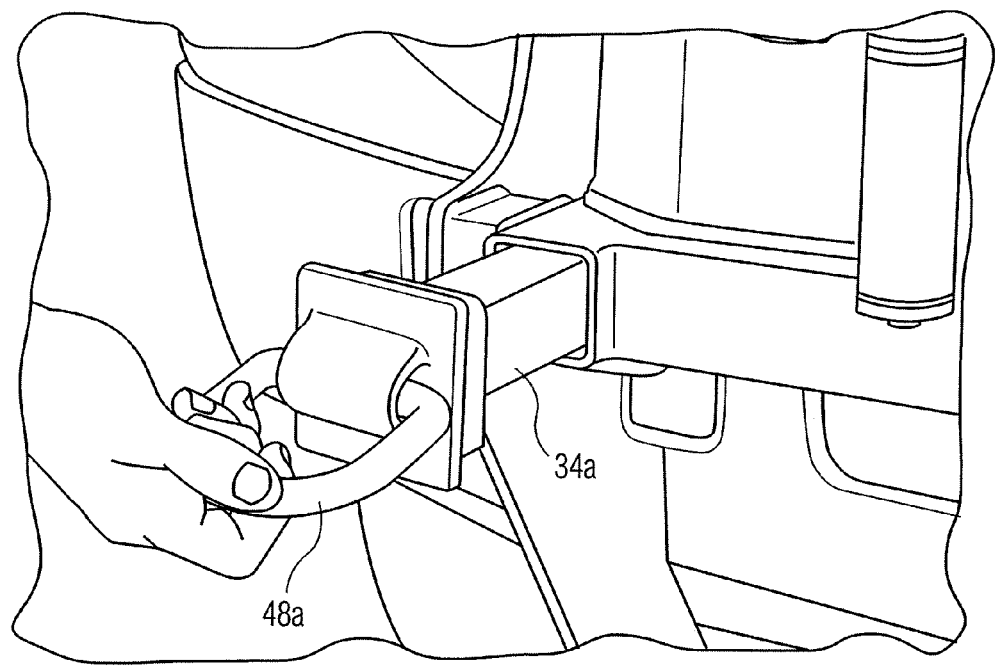
FIG. 14 is a detailed view showing the insertion or removal of a retaining anchor to hold a vehicle accessory on the brush guard of the VAM device.

Both the mounting pins 42 and 44 are retained by suitable cotter pins or the like as shown in FIG. 13.

Once installed on the brush guard, the vehicle accessory is held in place by inserting retaining anchors 34a, 34b through the cross members 18, 19 and the corresponding tubes 37a, 37b arranged in the gap between them. The pins 34a, 34b are preferably provided with D-rings 48a and 48b, respectively, which may be used for the same purpose as the factory installed D-rings 30a and 30b.

Figure 15:
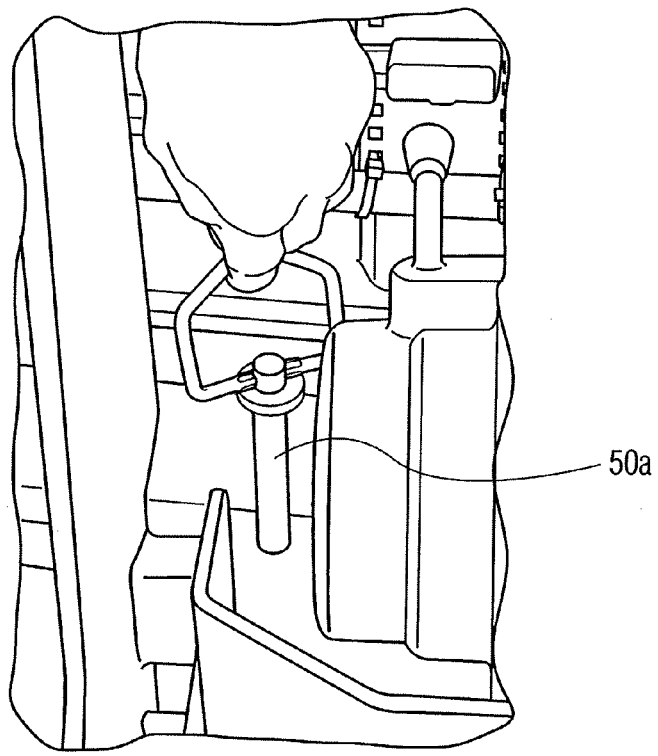
FIG. 15 is a detailed view showing the insertion or removal of a locking pin that holds the retaining anchor of FIG. 14 in position.

The retaining anchors 34a and 34b are held in place by pins 50a and 50b, as shown in FIGS. 6 and 15.

Figure 21:
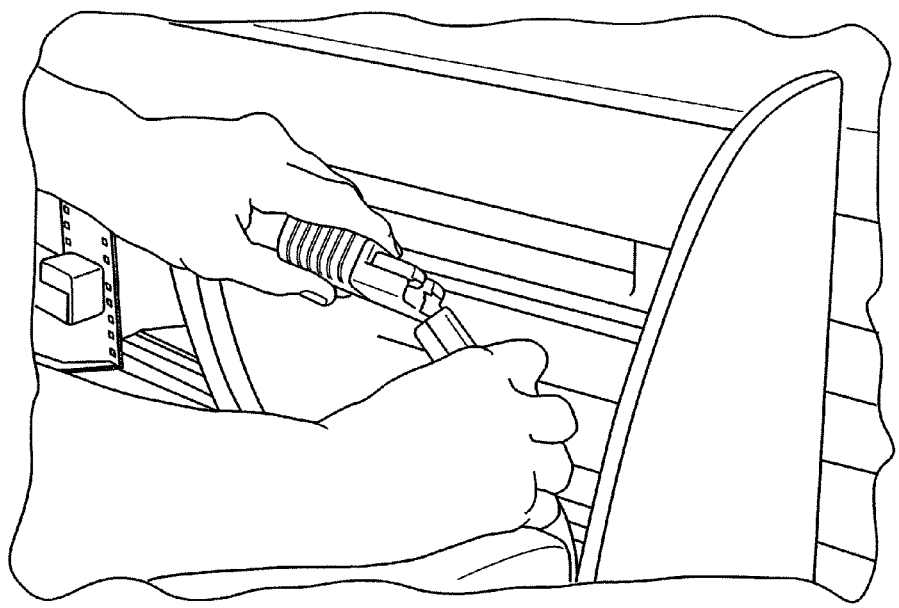
FIG. 21 is a detailed view, showing connection of an electric power line for a vehicle accessory winch.
Figure 22:
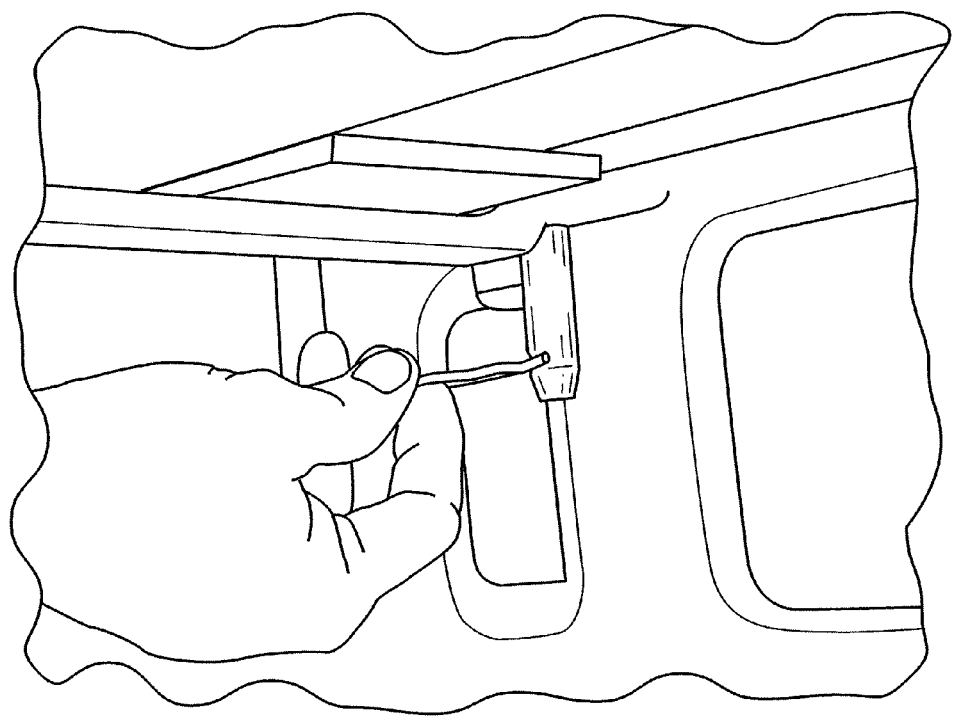
FIG. 22 is a detailed view, showing insertion of a cotter pin into a locking pin of the VAM device according to the invention.

Finally, after an electrically powered accessory, such as a winch, has been installed, the final step is to connect the electric power to the accessory from the motor vehicle battery, as shown in FIG. 21.

There has thus been shown and described a novel device for mounting an accessory to a motor vehicle which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A kit of parts for assembling a device that enables the removable attachment of an accessory to the front of a motor vehicle, said vehicle having a grille, a vehicle frame, and two mounting receptacles, each attached to the frame and positioned below the grille, for receiving a mounting bar, said kit comprising, in combination:

(a) a brush guard comprising two substantially parallel upright members and at least one cross-member interconnecting and retaining the two upright members in rigid, spaced-apart relationship, each of said upright members having two substantially horizontally extending mounting bars, thereby providing two upper mounting bars and two lower mounting bars, for removable attachment of the brush guard to the motor vehicle, bars said brush guard providing support for the removable attachment of a motor vehicle accessory;

(b) two upper mounting brackets, adapted to be attached to the vehicle frame in spaced-apart relationship at the front of the vehicle above the two mounting receptacles, each upper mounting bracket forming a hitch for a respective one of the two upper mounting bars of the brush guard; and (c) two mechanical fasteners for retaining the upper mounting bars on the mounting brackets;

wherein each of the two lower mounting bars is insertable in a respective one of said two mounting receptacles.

2. The kit of parts defined in claim 1, wherein each mechanical fastener comprises a mounting pin and each upper mounting bar has a hole for receiving a respective mounting pin.

3. The kit of parts defined in claim 2, wherein each mounting pin has a handle at one end thereof to facilitate removal by hand.

4. The kit of parts defined in claim 2, wherein each mounting pin has a pin hole therein to accommodate a cotter pin to hold the respective mounting pin in place on a mounting bar and mounting bracket.

5. The kit of parts defined in claim 1, further comprising two additional mechanical fasteners for retaining the lower mounting bars on the two mounting receptacles below the grille.

6. The kit of parts defined in claim 5, wherein each additional mechanical fastener comprises an additional mounting pin and each lower mounting bar has a hole for receiving a respective additional mounting pin.

7. The kit of parts defined in claim 6, wherein each additional mounting pin has a handle at one end thereof to facilitate removal by hand.

8. The kit of parts defined in claim 6, wherein each additional mounting pin has a pin hole therein to accommodate a cottar pin to hold the respective additional mounting pin in place on a mounting bar and mounting receptacle.

9. The kit of parts defined in claim 1, further comprising at least one anchor for retaining the vehicle accessory on the brush guard, and wherein said at least one cross-member has at least one substantially horizontal opening therein for insertion of said retaining anchor.

10. The kit of parts defined in claim 9, wherein said retaining anchor has a substantially rectangular cross-section.

11. The kit of parts defined in claim 10, wherein at least one retaining anchor includes an anchor loop at one end thereof for attaching a cable.

12. The kit of parts defined in claim 1, comprising at least two cross-members mounted substantially in parallel between said two upright members.

13. The kit of parts defined in claim 12, wherein said two cross-members are mounted in adjacent relationship, side by side at substantially the same height with a gap between them, to provide a platform for the vehicle accessory.

14. The kit of parts defined in claim 13, wherein said cross-members each have two horizontal openings therein, said openings being located at opposite ends of the respective cross-members each adjacent an upright member of the brush guard.

15. The kit of parts defined in claim 14, further comprising an accessory holder adapted to be attached to an accessory and having at least one portion configured to be inserted in the gap between the two cross-members.

16. The kit of parts defined in claim 15, wherein said at least one portion of the accessory holder has two horizontal openings arranged in alignment with said openings in said cross-members, for receiving a retaining anchor.

17. The kit of parts defined in claim 16, wherein each said retaining anchor and each opening has a substantially rectangular cross-section, thereby preventing the retaining anchors from rotating about their longitudinal axes.

18. The kit of parts defined in claim 17, wherein at least one retaining anchor includes an anchor loop at one end thereof for attaching a cable.

19. The kit of parts defined in claim 15, wherein said accessory is a winch and said accessory holder is adapted to be bolted to the winch.

20. The kit of parts defined in claim 1, wherein said brush guard further includes an additional cross-member connecting each of the two upright members near an upper extremity thereof.

21. The kit of parts defined in claim 1, wherein said brush guard further includes an additional cross-member connecting each of the two upright members near a lower extremity thereof.

22. The kit of parts defined in claim 1, wherein each of the two upper mounting brackets comprises a mounting plate with a plurality of holes therein to permit attachment to the vehicle frame in an upright position extending substantially transverse to a central longitudinal axis of the vehicle.

23. The kit of parts defined in claim 22, wherein each upper mounting bracket further includes a transverse plate, rigidly attached to one side of the mounting plate, having a recess therein for insertion of said mechanical fastener.

24. The kit of parts defined in claim 23, wherein the mechanical fastener comprises a mounting pin and the recess comprises a hole through each upper mounting bar for receiving a mounting pin.

25. The kit of parts defined in claim 24, wherein each mounting pin has a handle at one end thereof to facilitate removal by hand.

26. The kit of parts defined in claim 24, wherein each mounting pin has a pin hole therein to accommodate a cotter pin to hold the respective mounting pin in place on a mounting bar and upper mounting bracket.

27. A device for removably attaching an accessory to a frame of a motor vehicle, said device comprising, in combination:
   (a) a brush guard in the shape of a frame formed by two substantially parallel upright members and at least one cross-member interconnecting and retaining the two upright members in rigid, spaced-apart relationship, each of the two upright members having two substantially horizontally extending mounting bars, one at each end, thereby providing two upper mounting bars and two lower mounting bars for the removable attachment of the brush guard to the motor vehicle, said brush guard providing support for the removable attachment of a motor vehicle accessory;
   (b) two upper mounting brackets attached to the vehicle frame in spaced-apart relationship, the upper mounting bars being removably connectable thereto;
   (c) two lower mounting receptacles attached to the vehicle frame below a vehicle bumper, the lower mounting bars being removably connectable thereto;
   (d) a mechanical fastener for securing each of the upper and lower mounting bars to a respective one of said mounting brackets and receptacles.

28. The device defined in claim 27, wherein each mechanical fastener comprises a mounting pin and each upper mounting bar has a hole for receiving a respective mounting pin.

29. The device defined in claim 28, wherein each mounting pin has a handle at one end thereof to facilitate removal by hand.

30. The device defined in claim 28, wherein each mounting pin has a pin hole therein to accommodate a cotter pin to hold the respective mounting pin in place on a mounting bar and mounting bracket.

31. The device defined in claim 27, further comprising two additional mechanical fasteners for retaining the lower mounting bars on two mounting receptacles below the grille of a motor vehicle.

32. The device defined in claim 31, wherein each additional mechanical fastener comprises an additional mounting pin and each lower mounting bar has a hole for receiving a respective additional mounting pin.

33. The device defined in claim 32, wherein each additional mounting pin has a handle at one end thereof to facilitate removal by hand.

34. The device defined in claim 32, wherein each additional mounting pin has a pin hole therein to accommodate a cotter pin to hold the respective additional mounting pin in place on a mounting bar and mounting receptacle.

35. The device defined in claim 27, further comprising at least one anchor for retaining the vehicle accessory on the brush guard, and wherein said at least one cross-member has at least one substantially horizontal opening therein for insertion of said retaining anchor.

36. The device defined in claim 35, wherein said retaining anchor has a substantially rectangular cross-section.

37. The device defined in claim 36, wherein at least one retaining anchor includes an anchor loop at one end thereof for attaching a cable.

38. The device defined in claim 27, comprising at least two cross-members mounted substantially in parallel between said two upright members.

39. The device defined in claim 38, wherein said two cross-members are mounted in adjacent relationship, side by side at substantially the same height with a gap between them, to provide a platform for the vehicle accessory.

40. The device defined in claim 39, wherein said cross-members each have two horizontal openings therein, said openings being located at opposite ends of the respective cross-members each adjacent an upright member of the brush guard.

41. The device defined in claim 40, further comprising an accessory holder adapted to be attached to an accessory and having at least one portion configured to be inserted in the gap between the two cross-members.

42. The device defined in claim 41, wherein said at least one portion of the accessory holder has two horizontal openings arranged in alignment with said openings in said cross-members, for receiving a retaining anchor.

43. The device defined in claim 42, wherein each said retaining anchor and each opening has a substantially rectangular cross-section, thereby preventing the retaining anchors from rotating about their longitudinal axes.

44. The device defined in claim 43, wherein at least one retaining anchor includes an anchor loop at one end thereof for attaching a cable.

45. The device defined in claim 41, wherein said accessory is a winch and said accessory holder is adapted to be bolted to the winch.

46. The device defined in claim 27, wherein said brush guard further includes an additional cross-member connecting each of the two upright members near an upper extremity thereof.

47. The device defined in claim 37, wherein said brush guard further includes an additional cross-member connecting each of the two upright members near a lower extremity thereof.

48. The device defined in claim 27, wherein each of the two upper mounting brackets comprises a mounting plate with a plurality of holes therein to permit attachment to the vehicle frame in an upright position extending substantially transverse to a central longitudinal axis of the vehicle.

49. The device defined in claim 48, wherein each upper mounting bracket further includes a transverse plate, rigidly attached to one side of the mounting plate, having a recess therein for insertion of said mechanical fastener.

50. The device defined in claim 49, wherein the mechanical fastener comprises a mounting pin and the recess comprises a hole through each upper mounting bar for receiving a mounting pin.

51. The device defined in claim 50, wherein each mounting pin has a handle at one end thereof to facilitate removal by hand.

52. The device defined in claim 50, wherein each mounting pin has a pin hole therein to accommodate a cotter pin to hold the respective mounting pin in place on a mounting bar and upper mounting bracket.

* * * * *